Aug. 18, 1942.  G. H. FOSTER ET AL  2,293,030
METHOD OF PRODUCING DIPOTASSIUM MONOSODIUM FERRICYANIDE
Filed March 2, 1940
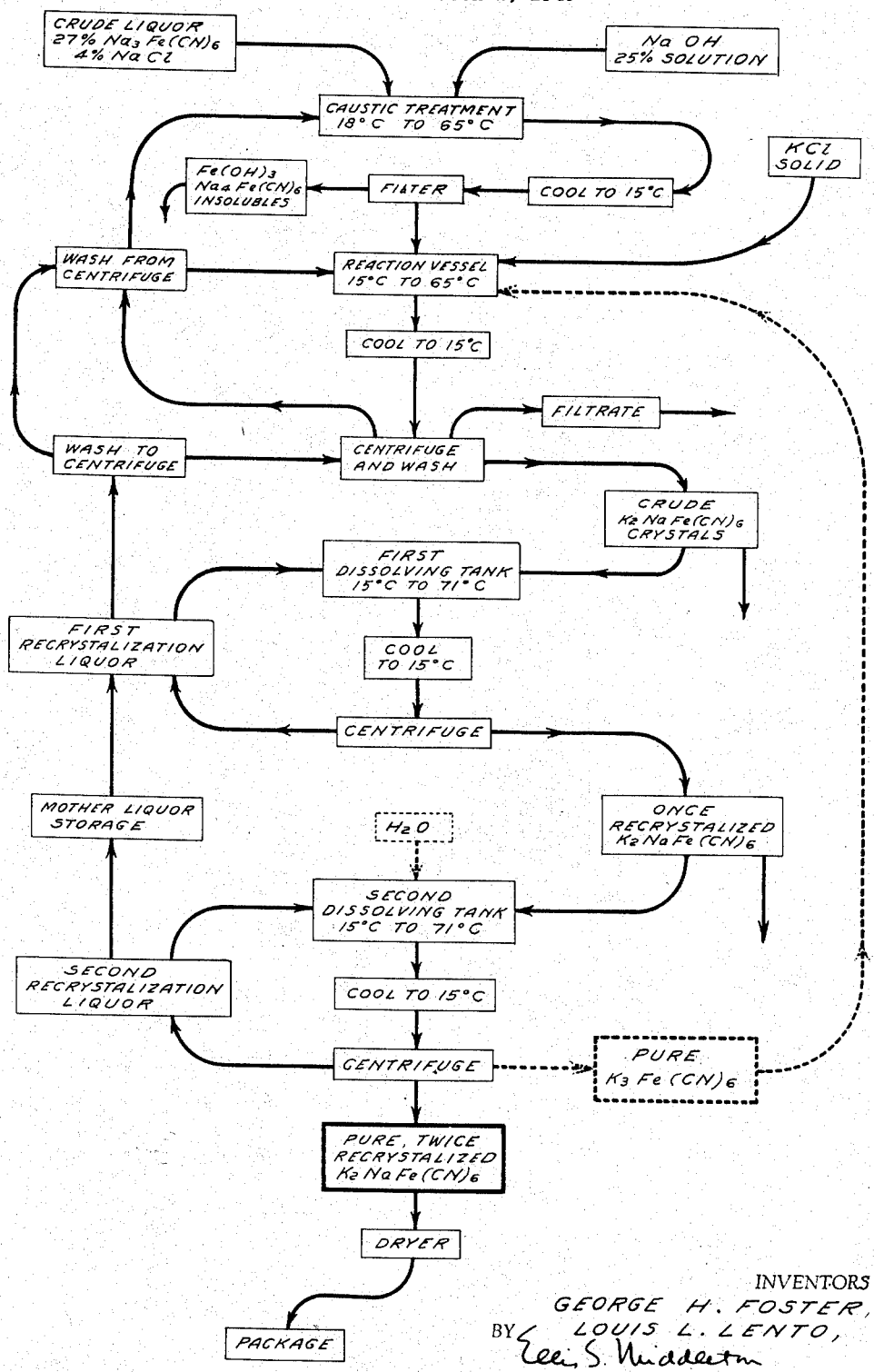
INVENTORS
GEORGE H. FOSTER,
LOUIS L. LENTO,
BY
ATTORNEY.

Patented Aug. 18, 1942

2,293,030

UNITED STATES PATENT OFFICE 2,293,030

METHOD OF PRODUCING DIPOTASSIUM MONOSODIUM FERRICYANIDE

George H. Foster and Louis L. Lento, Jr., Stamford, Conn., assignors to American Cyanamid Company, New York, N. Y., a corporation of Maine Application March 2, 1940, Serial No. 321,933

2 Claims. (Cl. 23—77)

The present invention relates to the preparation of dipotassium mono-sodium ferricyanide.

In commercial practice, potassium ferricyanide is made by oxidizing potassium ferrocyanide as by means of chlorine, thereby losing one quarter of the potassium as chloride. Furthermore, the initial potassium has usually been furnished as the more expensive potassium carbonate or potassium hydroxide.

It is the principal object of the present invention, therefore, to produce a double alkali metal ferricyanide containing potassium from a cheaper starting material, all by a simple and efficient cyclic process.

Inasmuch as the user of ferricyanides is more particularly interested in the ferricyanide content, the dipotassium monosodium salt is to be desired over the tripotassium salt in that the former contains 105% ferricyanide based upon potassium ferricyanide.

The invention in its broadest aspect contemplates reacting a soluble potassium salt, which will not deleteriously affect sodium ferricyanide, consisting of and/or including potassium ferricyanide, with sodium ferricyanide in aqueous solution and continuing the processing under such conditions of temperature and concentration that dipotassium monosodium ferricyanide may be crystallized therefrom. The invention further contemplates the recrystallization of the crude double salt with recirculation of mother liquors in such a manner that a product is obtainable containing less than .01% chlorides and less than .05% potassium ferrocyanide.

The flow sheet diagrammatically illustrates the process.

Generally speaking, the invention contemplates adding a solid potassium salt such as the chloride, sulfate, nitrate, carbonate or the like to an aqueous solution of sodium ferricyanide, preferably containing more than 25% thereof. The amount of potassium salt added should be from 1 to 4 mols per mol of sodium ferricyanide. Such a mixture results in the formation of quantities of dipotassium monosodium ferricyanide, the solubility of which in the solution substantially saturated with the potassium salt causes the former to precipitate out. Copious quantities of the double salt may be precipitated by cooling the reaction mixture to the neighborhood of 15° C.

Upon this first crystallization, the double salt is substantially 99% pure and contains less than 1% chlorides.

By dissolving this crude double salt in mother liquor from a first recrystallization step, the purity thereof may be stepped up to 99.5% while the chloride content decreases to less than .1%. Repeating the recrystallization produces a product which may be said to be of reagent grade inasmuch as it contains less than .01% chloride and less than .05% potassium ferrocyanide.

It is preferable to make frequent cycles to dissolve the once recrystallized double salt in fresh water, to produce a saturated solution. As a result of cooling this solution to 15° C., the less soluble potassium ferricyanide is precipitated. This may then be returned to the cycle to replace all or a part of the solid potassium salt added to the reaction vessel. This procedure, of course, need be carried out only upon the occasions of using make-up water to dissolve the once recrystallized double salt.

While the above general outline uses as a starting material a substantially pure sodium ferricyanide solution, yet what may be termed a crude sodium ferricyanide solution may likewise be used with appropriate treatment.

In the commercial production of sodium ferricyanide, sodium ferrocyanide is oxidized as by means of chlorine. Due to the crude material from which the original sodium ferricyanide is made, many impurities carry straight through to the final solution of sodium ferricyanide. Among such impurities is sodium chloride which may be present in amounts greater than 4% as well as complex ferri ferri color bodies and insolubles. If this crude liquor is used as the starting material, it is desirable to preliminarily treat the same as by means of caustic soda solution in excess so as to decompose the ferri ferri complexes and convert them to ferric hydroxide. A filtration operation may then be resorted to to remove this iron hydroxide and other insolubles. The presence of normal quantities of sodium chloride is not detrimental to the process.

As a specific example, a crude sodium ferricyanide solution containing 27% of that salt and 4% sodium chloride with a pH of about 8.3 was treated with a 25% caustic soda solution with agitation until a pH of 9.5 was reached. 0.75% excess caustic soda, based on weight of batch being treated, was added beyond this point to insure the decomposition of the ferri ferri complexes. The color of the initial crude ferricyanide solution was green, due to these complexes, whereas after the caustic soda solution and a filtering step to remove ferric hydroxide, sodium ferrocyanide and other insolubles, the color was red. This caustic treatment preferably takes place while the batch has been heated to not exceeding 65° C., following which it is cooled to approximately 15° C. prior to filtration. The filter cake is discarded.

To the filtrate was added solid potassium chloride in an amount substantially three molar based upon the sodium ferricyanide content of the initial liquor. The salt was added in solid form in order to avoid the introduction of unnecessary quantities of water.

The charge was heated to 65° C. and agitated. The reaction mass was then cooled to 15° C. and centrifuged to remove the crude moist dipotassium monosodium ferricyanide crystals. The centrifuge cake was washed with the filtrate from a first crystallization step. The centrifuge liquor was returned to the cycle for further treatment inasmuch as it still contained valuable quantities of the double salt. The washed crude double salt crystals from the centrifuge after drying were found to be 99% dipotassium monosodium ferricyanide with less than 1% chloride.

In order to recrystallize the crude double salt to improve its purity, it was dissolved in the filtrate from a first crystallization step, heated to substantially 70° C. so as to effect complete solution. Upon cooling this liquor to 15° C., a copious crop of recrystallized double salt was thrown down. Upon centrifuging and drying the moist recrystallized material, its purity was found to be 99.5% with less than .1% chloride. The centrifuge liquor from this first crystallization step was returned to the cycle.

The recrystallized double salt was subjected to a second recrystallization step by dissolving it in the filtrate from a previous second recrystallization and heated to substantially 71° C. to effect complete solution. Upon again cooling to 15° C. and centrifuging, without washing, the dried, twice recrystallized material proved to be dipotassium monosodium ferricyanide of reagent grade containing less than .01% chloride and less than .05% potassium ferrocyanide. The centrifuged liquor from the second crystallization was returned to the cycle.

From the above, it will be observed that the process as described is a completely closed cycle, the soluble impurities, principally chlorides, going out with the filtrate from the original separation of the crude double salt.

This necessitates supplying fresh water to the cycle. It is preferred that this water be introduced as solvent for the crystals from the first recrystallization step. Under these circumstances, potassium ferricyanide being less soluble at 15° C. than dipotassium monosodium ferricyanide, the former will be precipitated upon cooling to that temperature. Under those circumstances, the tripotassium salt of reagent purity is produced having less than .01% chlorides and less than .05% potassium ferrocyanide.

In commercial operations, it is preferable to make one pass using water to dissolve the once crystallized double salt, the pure potassium ferricyanide produced as a result thereof being used for any purpose. In the next several passes or cycles, the mother liquor from centrifuging the twice crystallized material is used as the solvent and on these passes, $K_2Na(CN)_6$ is produced.

Using the above procedure and starting with 3,915 pounds of a crude sodium ferricyanide liquor containing 27% of the salt, in ten cycles, using this quantity of material for each, there can be produced 1,000 pounds of pure potassium ferricyanide on that pass using fresh water as the solvent, and 9,000 pounds of pure dipotassium monosodium ferricyanide on the next nine passes where the mother liquor from a second crystallization is used to dissolve the once crystallized double salt.

Where the potassium ferricyanide produced as above is to be used solely as the solid inorganic salt to react with the sodium ferricyanide, this may be returned to the cycle as such.

However, it may be desirable under some circumstances to replace only a part of the potassium chloride with potassium ferricyanide. Inasmuch as for each pass or cycle using 1,000 pounds of a sodium ferricyanide solution containing 27% of the latter, 252 pounds of solid potassium chloride are required to produce 271 pounds of the double salt, on for instance a tenth cycle, 334 pounds of potassium ferricyanide may be added along with the 252 pounds of potassium chloride. Such a procedure results in the production of 318 additional pounds of the double salt making approximately 589 pounds in all.

While the invention has been shown and described with specific reference to particular embodiments, it is to be understood that it is not to be limited thereto but is to be construed broadly and restricted solely by the scope of the appended claims.

We claim:
1. A method of making $K_2NaFe(CN)_6$ which includes the following steps, adding solid $K_3Fe(CN)_6$ and solid KCl to a solution of $Na_3Fe(CN)_6$ containing at least 25% thereof, heating the reaction mixture to substantially 65° C. until all the added potassium salt has been dissolved, the total amount of potassium salt added being sufficient to saturate a solution thereof at 65° C., cooling the reaction mixture to substantially 15° C. and recovering therefrom the precipitated $K_2NaFe(CN)_6$.

2. A method of making $K_2NaFe(CN)_6$ which includes the following steps, treating a crude $Na_3Fe(CN)_6$ solution containing at least 25% thereof and NaCl with a caustic soda solution until the pH of the batch is 9.5, adding an excess of caustic soda and heating the batch to substantially 65° C. to insure decomposition of the ferri ferri complexes, cooling to substantially 15° C., filtering to remove ferric hydroxide, sodium ferrocyanide and other insolubles, adding solid KCl and solid $K_3Fe(CN)_6$, heating to effect solution thereof, the total amount of potassium salt added being from 1 to 4 mols per mol of $Na_3Fe(CN)_6$ present and sufficient to saturate the solution therewith at the solution temperature, cooling to substantially 15° C. and recovering the $K_2NaFe(CN)_6$.

GEORGE H. FOSTER.
LOUIS L. LENTO, JR.